(12) United States Patent
Damera-Venkata

(10) Patent No.: US 9,167,130 B2
(45) Date of Patent: Oct. 20, 2015

(54) AM-FM HALFTONE SCREEN DESIGN

(75) Inventor: Niranjan Damera-Venkata, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1493 days.

(21) Appl. No.: 10/986,587

(22) Filed: Nov. 12, 2004

(65) Prior Publication Data

US 2006/0103883 A1    May 18, 2006

(51) Int. Cl.
*H04N 1/405* (2006.01)
*G06K 15/00* (2006.01)

(52) U.S. Cl.
CPC .................................. *H04N 1/4055* (2013.01)

(58) Field of Classification Search
USPC .................... 358/3.2, 3.06, 3.26, 1.9
See application file for complete search history.

(56) References Cited

U.S. PATENT DOCUMENTS

| | | | |
|---|---|---|---|
| 5,276,535 A * | 1/1994 | Levien | 358/3.03 |
| 6,335,989 B1 * | 1/2002 | Lin | 382/260 |
| 6,707,576 B1 * | 3/2004 | Chang | 358/1.9 |
| 6,798,537 B1 * | 9/2004 | Lau et al. | 358/1.9 |
| 7,099,049 B2 * | 8/2006 | Yu et al. | 358/3.26 |
| 7,365,883 B2 | 4/2008 | Damera-Venkata | |
| 2003/0035146 A1 * | 2/2003 | Yu et al. | 358/3.14 |
| 2004/0218222 A1 | 11/2004 | Damera-Venkata | |
| 2005/0219623 A1 * | 10/2005 | Hiramoto et al. | 358/3.06 |

OTHER PUBLICATIONS

Velho, L. et al., "Digital Halftoning with Space Filing Curves", Computer Graphics 25, p. 81-90, Jul. 1991.
Scheermesser, T. et al., "Control of Texture in Image Halftoning", J. Opt. Soc. Am. A 13, p. 1645-1652, Aug. 1996.
Lau, D. L. et al., "Green-Noise Digital Halftoning", Proc. of the IEEE 86, p. 39-43, Dec. 1998.
Lau, D. L. et al., "Digital Color Haltoning with Generalized Error-Diffusion and Green-Noise Masks", IEEE Trans. Image Processing 9, p. 923-935, May 2000.
Levien, R., "Output Dependent Feedback in Error Diffusion Halftoning", IS&T Imaging Science and Technology 1, p. 115-118, May 1993.
He, Z. et al., "AM-FM Halftoning: A Method for Digital Halftoning Through Simultaneous Modulation of Dot Size and Dot Placement", Proc. SPIE Color Imaging, Nov. 2001.
Damera-Venkata, N. et al., "AM-FM Screen Design Using Donut Filters", Proc. of SPIE-IS&T Electronic Imaging, SPIE vol. 5293, Jan. 22, 2004.
Damera-Venkata, N. et al., "AM-FM Screen Design Using Donut Filters", Powerpoint, Jan. 22, 2004.
Li, P. et al., "Clustered Minority Pixel Error-Diffusion", Proc. IEEE Conf. Image Processing 1, p. 641-644, Sep. 2002.
Lau, D. L. et al., "Blue and Green-Noise Halftoning Models", IEEE Signal Processing Magazine 20, p. 28-38, Jul. 2003.
Ulichney, R., "The Void-and-Cluster Method for Dither Array Generation", Proc. SPIE Human Vision, Visual Processing and Digital Display IV 1913, p. 332-343, Feb. 1993.
Lin, Q. et al., "Color FM Screen Design Using DBS Algorithm", Proc. SPIE Color Imaging: Device-Independent Color, and Graphic Arts III 3300, p. 353-361, Jan. 1998.

* cited by examiner

*Primary Examiner* — Quang N Vo
(74) *Attorney, Agent, or Firm* — Hugh P Gortier

(57) ABSTRACT

A method of generating a halftone screen includes growing clusters according to at least one linear filter based on a spatial probability profile function. The clusters can be grown with filters that are parameterized according to gray level.

26 Claims, 6 Drawing Sheets

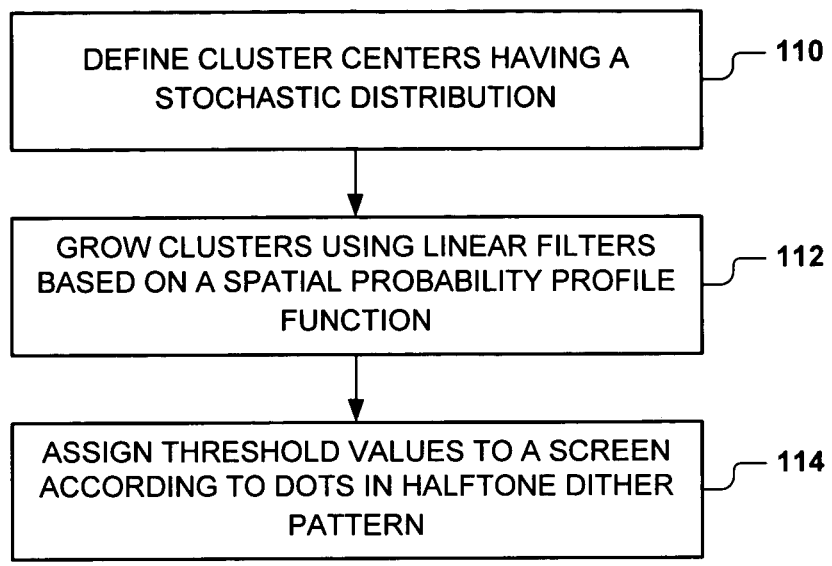
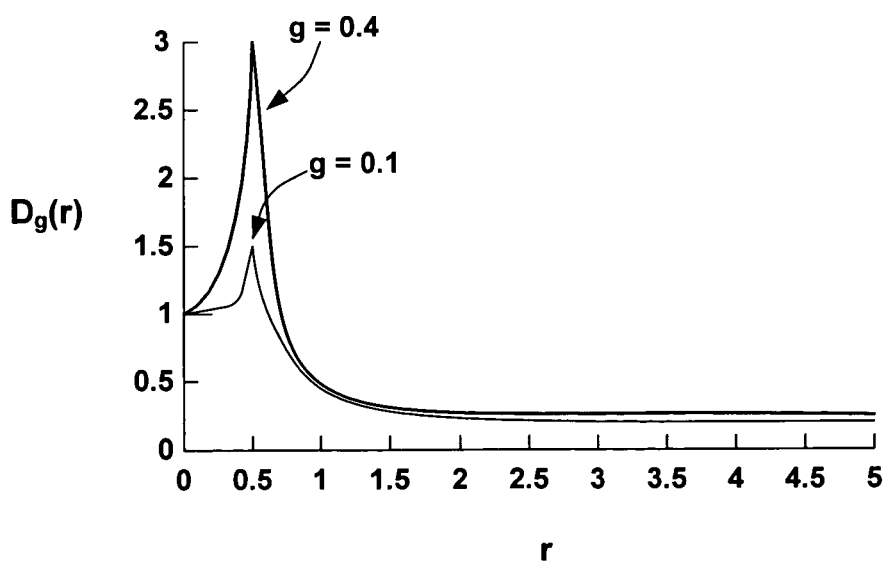

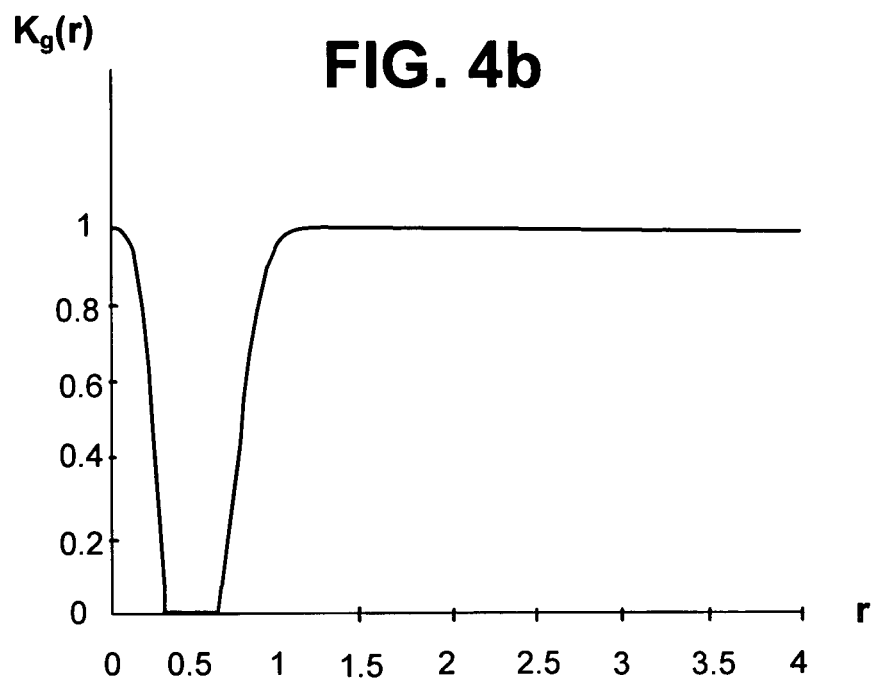
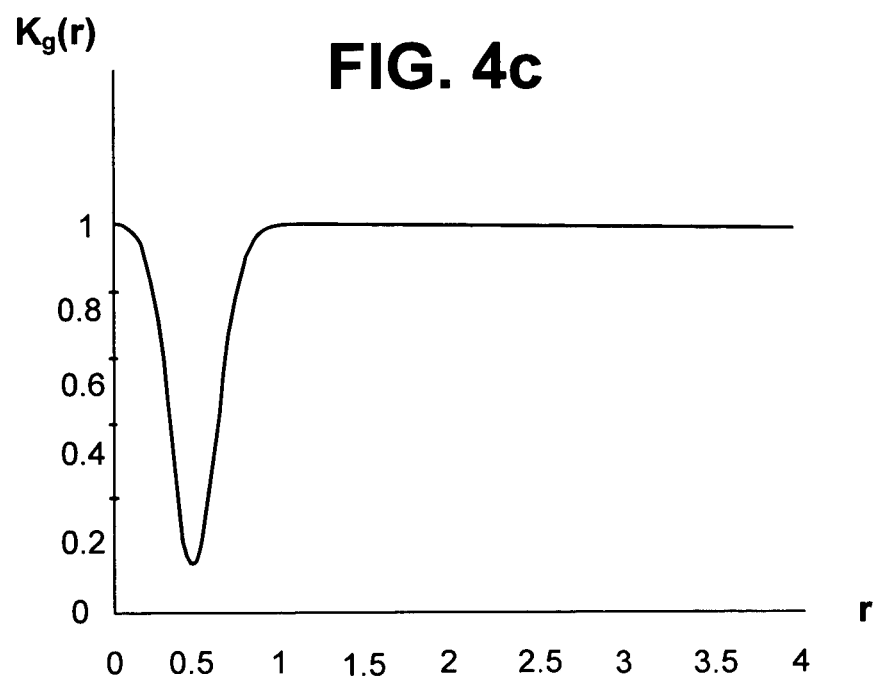

AM-FM HALFTONE SCREEN DESIGN

BACKGROUND

Halftoning involves rendering continuous tone ("contone") digital grayscale and color images as patterns of pixels that can be displayed by printers and other display devices having a limited number of display colors. The rendered images are commonly referred to as halftone images. The pixels of a halftone image are arranged in patterns such that the halftone image is perceived as having continuous tones when viewed through the human visual system.

As applied to printing, Frequency Modulation ("FM") halftoning involves varying the number or density of ink dots in an area to achieve a tone. The ink dots are isolated and have uniform size. The human visual system perceives areas of the FM halftone image having a greater density of dots to be darker than areas having a lower dot density.

Laser printers and some other image forming devices do not stably or reliably produce isolated dots beyond a certain horizontal dot resolution. For example, some laser printers operate in an enhanced resolution imaging mode, sometimes referred to as a High Definition Imaging (HDI) mode. In HDI mode, the laser horizontal scan line of the normal resolution mode is subdivided into finer increments, whereby the laser printer produces dots during correspondingly shorter laser on/off cycles. For example, if the normal horizontal resolution mode of a laser printer is 600 dots per inch (dpi), and the enhanced horizontal resolution mode of that laser printer is 2,400 dpi, then each pixel of the halftone image produced by that laser printer in HDI mode is subdivided into four subpixels, so that the laser on/off cycle in the HDI mode is ¼th the laser on/off cycle in the normal horizontal resolution mode. Such dot instability can result in perceptible visual anomalies or quantization noise in the resulting halftone image produced by the laser printer. Dot dropouts can occur in highlights, plugging can occur in shadows, and grainy appearances due to dot clumping in mid-tones can occur.

Dot instability can be reduced by clustering the dots. Conventional dot clustering involves using periodic arrangements of pixel clusters on a grid that provides stable dot transfer. Tones can be made darker by making the clusters larger. The pattern power spectra of the clustered dots exhibits a strong mid-frequency component, as opposed to the strong high frequency component exhibited by the isolated dots. However, since the grid frequency can interact with texture in an image or with other color planes or with a scanning grid, Moire and other undesirable beat patterns can result.

These undesirable patterns can be reduced or eliminated by AM-FM halftoning. AM-FM halftoning involves using stochastic spatial point processes with clusters of dots of variable size and density. Clustered-dot stochastic halftone arrangements produce halftone images exhibiting halftone noise that is very similar to the grain noise in a photograph. These halftone images better resemble real photographs.

An AM-FM halftone screen can be used to render an AM-FM halftone image from a contone image. In general, a halftone screen (also referred to as a dither matrix) consists of a two-dimensional array of thresholds, each threshold having a value v ranging from 0 to (z−1), where z represents the total number of gray levels within the gray scale range being used. For example, $0 \le v \le 255$ on an 8-bit gray scale, where 0 represents white and 255 represents black.

During halftoning of a monochrome image, a halftone screen is typically tiled across a monochrome image. Each pixel of the monochrome image is compared to a spatially corresponding threshold in a halftone screen. If the value of the pixel in the monochrome image is larger than the threshold value, a dot is formed in the corresponding position of the halftone image, assuming an ascending gray scale is employed (i.e., where higher gray levels correspond to darker gray tones).

An AM-FM screen can be designed by selecting cluster centers, and growing the clusters about their centers. The cluster centers can have a stochastic distribution.

A challenge to AM-FM screen design is deciding how to grow the clusters. The clusters should be grown in a manner that provides visually pleasing halftones.

Another challenge is generating a halftone screen that achieves a desired stochastic dot distribution, while minimizing the need for experimentation. One approach towards screen design involves using different filters for each gray level, and then selecting the filter that produces the best results. However, this approach can be time consuming and expensive since there is no explicit connection between the desired distribution and empirical parameters.

SUMMARY

According to one aspect of the present invention, a method of generating a halftone screen includes growing clusters according to at least one linear filter based on a spatial probability profile function.

According to another aspect of the present invention, a method of designing a halftone screen includes using parameterized filters to grow dot clusters at gray levels with respect to a gray transition level, the filters parameterized according to gray level.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1 is an illustration of a general method of designing an AM-FM halftone screen according to an embodiment of the present invention.

FIG. 2 illustrates impulse responses of parametric linear filters according to an embodiment of the present invention.

DETAILED DESCRIPTION

Figure 3:
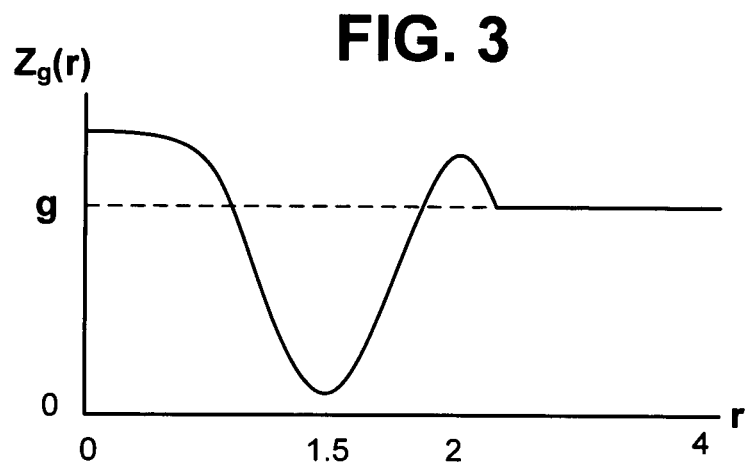
FIGS. 3-5 are illustrations of spatial probability profile functions according to embodiments of the present invention.

As shown in the drawings for purposes of illustration, the present invention is embodied in the design of an AM-FM halftone screen. The screen has an m×n array of thresholds. In a typical screen, m=n=256, or m=n=128. However, the screen is not limited to those dimensions.

Each threshold in the screen has a value (v) ranging between 0 and (L−1), where L represents the total number of gray levels within the gray scale being used. In an 8-bit gray scale, for example, $L=2^8$ and $0 \le v \le 255$. If the 8-bit gray scale is ascending, v=0 represents the lowest intensity (e.g., white)

and v=255 represents the highest intensity (e.g., black). The $l^{th}$ gray level may be expressed as a percentage (g), where g=l/L.

The general approach toward assigning the threshold values involves creating a dither halftone pattern at each gray level, and using the halftone pattern to assign the threshold values. A dither halftone pattern refers to an m×n pattern of pixels. Each pixel of the dither pattern corresponds spatially to a threshold in the screen, and each pixel is represented by either a "dot" or a "void" (i.e., an absence of a dot). The gray level specifies the concentration of dots in the dither halftone pattern. If g=0.1, then 10% of the pixels will be represented by dots, and the remaining 90% will be represented by voids. During the design of the halftone screen, the values are assigned to the thresholds. Creation of the dither halftone patterns is not limited to any particular halftoning method.

Reference is now made to FIG. 1, which illustrates a method of designing an AM-FM halftone screen. At block 110, cluster centers are defined for gray levels between an initial gray level and a transition gray level. For example, a halftone pattern is generated at the initial gray level. Each cluster center may include one or more pixels. The number of dots forming the cluster centers will depend on factors such as minimum reproducible dot size. At each additional gray level up to the transition gray level, cluster centers are added to the halftone pattern until the desired dot concentration at that gray level is obtained. The cluster centers are placed below the transition gray level to form highlights.

Distribution of the cluster centers is stochastic. Thus, the distance between cluster centers is not uniform. The average distance between cluster centers at a gray level, known as the principle wavelength (g), may be expressed as $\lambda_g = 1/\sqrt{g}$ for $g_0 < g < g_t$ where $g_0$ is the initial gray level and $g_t$ is the transition gray level. The cluster centers are not limited to any particular distribution or method of defining them. For example, the cluster centers could be determined as described in an article entitled "FM screen design using the DBS algorithm", by J. Allebach and Q. Lin, published in *Proc. IEEE International Conf. on Image Processing*, Vol. I, pp. 549-552, September 1996.

At block 112, the clusters are grown using parameterized linear filters based on a spatial probability profile function. The spatial probability profile function defines the desired shape and size of the clusters. The spatial probability function encodes the probability of seeing a minority pixel at a given inter-minority pixel distance (r) from the center of any dot-cluster of minority pixels. According to the spatial probability function, the probability of seeing a minority pixel at a given distance r from a minority pixel in a cluster is equal to the unconditional probability of seeing a minority pixel as the given distance r increases.

As used herein, the term "minority pixel" in an ascending gray scale refers to a dot for all gray levels g≤0.5, and the term "majority pixel" refers to a dot for all gray levels g>0.5. In a descending gray scale, a minority pixel would refer to void (i.e., no dot) for all gray levels g≤0.5, and a majority pixel would refer to a void for all gray levels g>0.5.

The clusters are grown by using a filter that can produce the distribution closest to the specified spatial probability profile. For example, a donut filter may be used. The radial profile of a donut filter has a low impulse response at the center (the DC), that rises to a peak, and drops off rapidly as the pixel distance from the center is increased. Thus, peaks occur away from the center, in order to cause a stochastic clustering of dots in the dither halftone pattern at its corresponding gray level. However, these features are not limiting to the present invention, in its broadest aspects.

The filter may be parameterized according to gray level. A parameterized donut filter may be constructed according to the following formula:

$$D_g(r) = (1-\alpha)\frac{\log(\delta + Z_g(r))}{\log(\delta + Z_g(0))} + \alpha e^{-r^2}$$

where g is the gray level, r is the radial distance from a center, δ is a small parameter that prevents taking the log of zero, and a is a parameter that promotes uniform dot growth. This filter is most likely to give the specified spatial probability profile in the maximum likelihood sense. The parameterization allows a single filter to be used per gray level.

Other filters may be used. For example, a linear donut filter that is not parameterized according to gray level may have the following construction:

$$D(r) = \gamma\left[e^{-\lambda\frac{r^2}{2}} - e^{-\lambda r^2}\right].$$

Other examples of linear filters may be found in assignee's U.S. Pat. No. 6,335,989.

Each filter may be linearly spatially invariant. A linearly spatially invariant filter can be implemented efficiently with a Fast Fourier Transform.

The clusters may be grown one gray level at a time. At each gray level, dots are added until the desired dot concentration is obtained.

At block 114, threshold values are assigned to the screen according to the dots in the halftone dither pattern(s). The threshold values may be assigned as the cluster centers are determined and as the clusters are grown.

FIG. 2 depicts the response of a first filter $D_{0.1}(r)$ for gray level g=0.1 and the response of a second filter $D_{0.4}(r)$ for gray level g=0.4. Both filters have an impulse response around r=0.5, where r is the average distance between minority pixels.

Figure 4A:
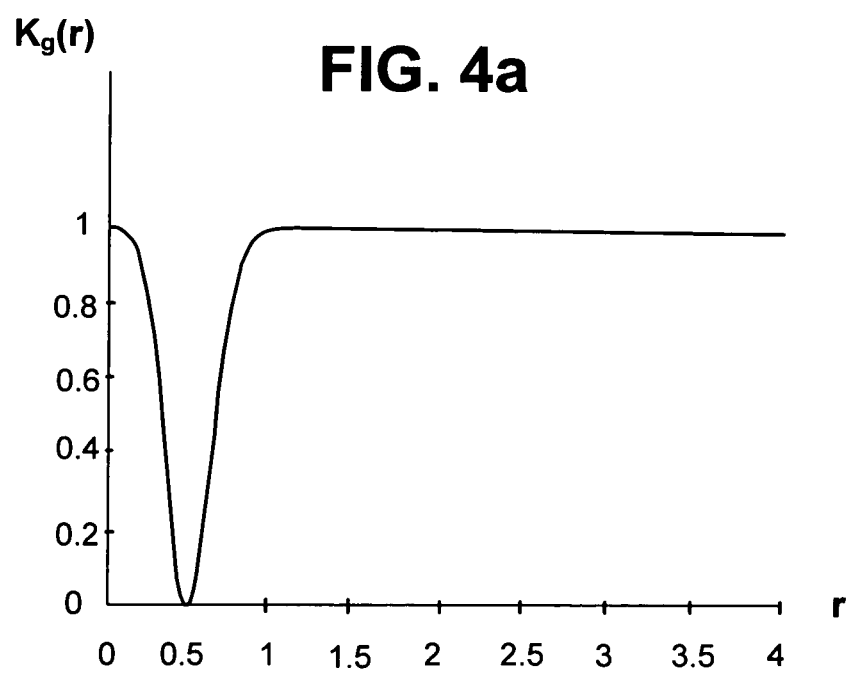
Figure 5:
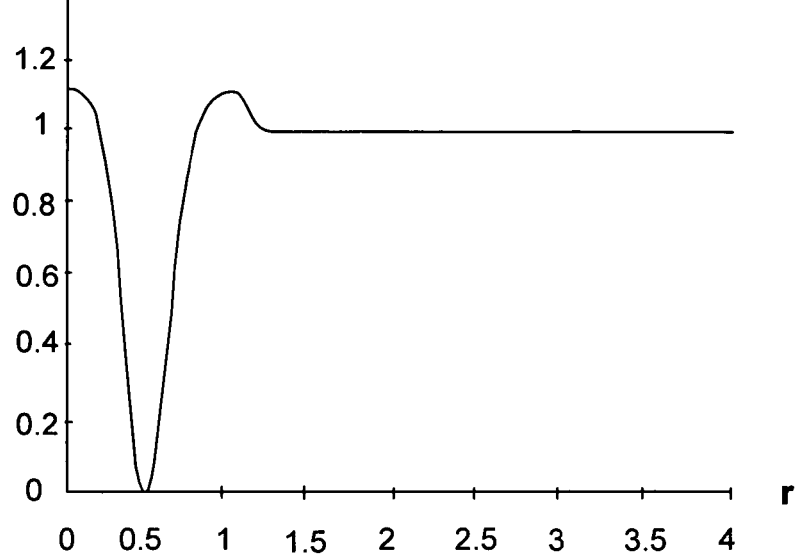

Exemplary spatial probability profile functions are illustrated in FIGS. 3-5. These profiles promote the addition of dots at the interdot distance and inhibit the addition of dots between two existing dots. These functions can be expressed as $Z_g(r)$ or $K_g(r)$, where $$Z_g(r) = \begin{cases} gK_g(r) & \text{for } 0 < g \leq 0.5 \\ (1-g)K_g(r) & \text{for } 0.5 < g \leq 1 \end{cases}.$$

The function $K_g(r)$ is normalized for g, and asymptotes at $K_g(r)=1$. The function $Z_g(r)$ is not normalized, and asymptotes at $Z_g(r)=g$.

FIG. 3 illustrates an exemplary spatial probability profile function $Z_g(r)$, which defines desired spatial halftone statistics of a halftone pattern produced by the screen at a gray level g. The exemplary spatial probability profile function $Z_g(r)$ shown in FIG. 3 represents a desired radial distribution of minority pixels in the corresponding gray level $g_i$ of the output halftone image. In an exemplary embodiment, the average distance (r) is $$r = \begin{cases} \dfrac{1}{\sqrt{g}} & \text{for all } g \leq g_t \\ \dfrac{1}{\sqrt{1-g}} & \text{for all } g > 1 - g_t \end{cases}$$

FIG. 4a illustrates a spatial probability profile function having no peaks. The function of FIG. 4a may be defined as $K_g(r)=1+\delta-e^{-a(r-b)^2}$. The spatial probability profile function of FIG. 4a is maximally flat and has a minimum at about r=0.5.

FIG. 4b illustrates another spatial probability profile function $K_g(r)$ having no peaks. However, the spatial probability profile function of FIG. 4b has a dead zone (at $0.4 \leq x \leq 0.6$) at the minimum. The dead zone reinforces stricter separation between dots.

FIG. 4c illustrates yet another spatial probability profile function $K_g(r)$ having no peaks. The spatial probability profile function of FIG. 4c has a smaller peak-to-valley distance than the functions of FIGS. 4a and 4b. The smaller peak-to-valley distance allows larger clusters to be formed.

FIG. 5 illustrates a spatial probability profile function having a minimum and a maximum. The maximum is at the interdot distance (about r=1), and the minimum is half of the interdot distance (about r=0.5).

The spatial probability profile functions are not limited to the examples illustrated in FIGS. 3-5. For example, another profile function can represent a desired non-radial distribution, and yet another profile function can represent a radial distribution in a first direction and a non-radial distribution in a second direction.

Actual values for the spatial probability profile functions can depend upon the printer and printing requirements. As a first example, the spatial probability profile function has a peak-to-valley distance that allows the printer to produce clusters that are large enough. As a second example, a dead zone is introduced in the spatial probability profile function so the printer does not produce dots that are clumped together.

Figure 6:
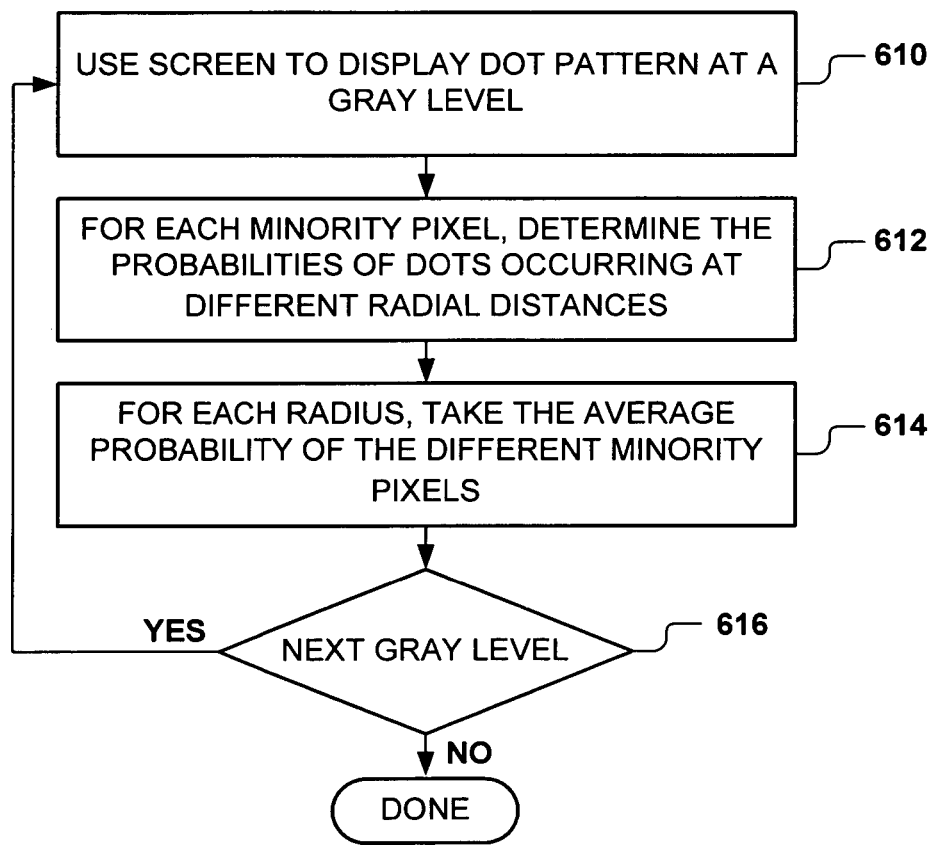
FIG. 6 is an illustration of a method of generating a spatial probability profile function from an existing halftone screen.

Referring to FIG. 6, a spatial probability profile function could be created from an existing screen. At block 610, the screen is used to a display dot pattern for a gray level. At block 612, the probability of seeing a dot at a given distance from each minority pixel in the pattern is determined. This probability may be computed by creating an annulus at each radial distance from the minority pixel. For each annulus (i.e., for each radial distance), the number of minority pixels in the annulus is divided by the total number of minority pixels in the pattern. At block 614, for each radius, the probabilities of the different minority pixels are averaged together.

The steps at blocks 610-614 may be performed for each additional gray level (block 616). These steps produce a spatial probability profile function that is dependent upon gray level (g). For a more detailed understanding of spatial halftone statistics, see R. Ulichney, *Digital Halftoning*, MIT Press, Cambridge, Mass. (1987); and D. Stoyan et al., *Stochastic Geometry and its Applications*, Wiley, New York, N.Y. (1987).

Figure 7:
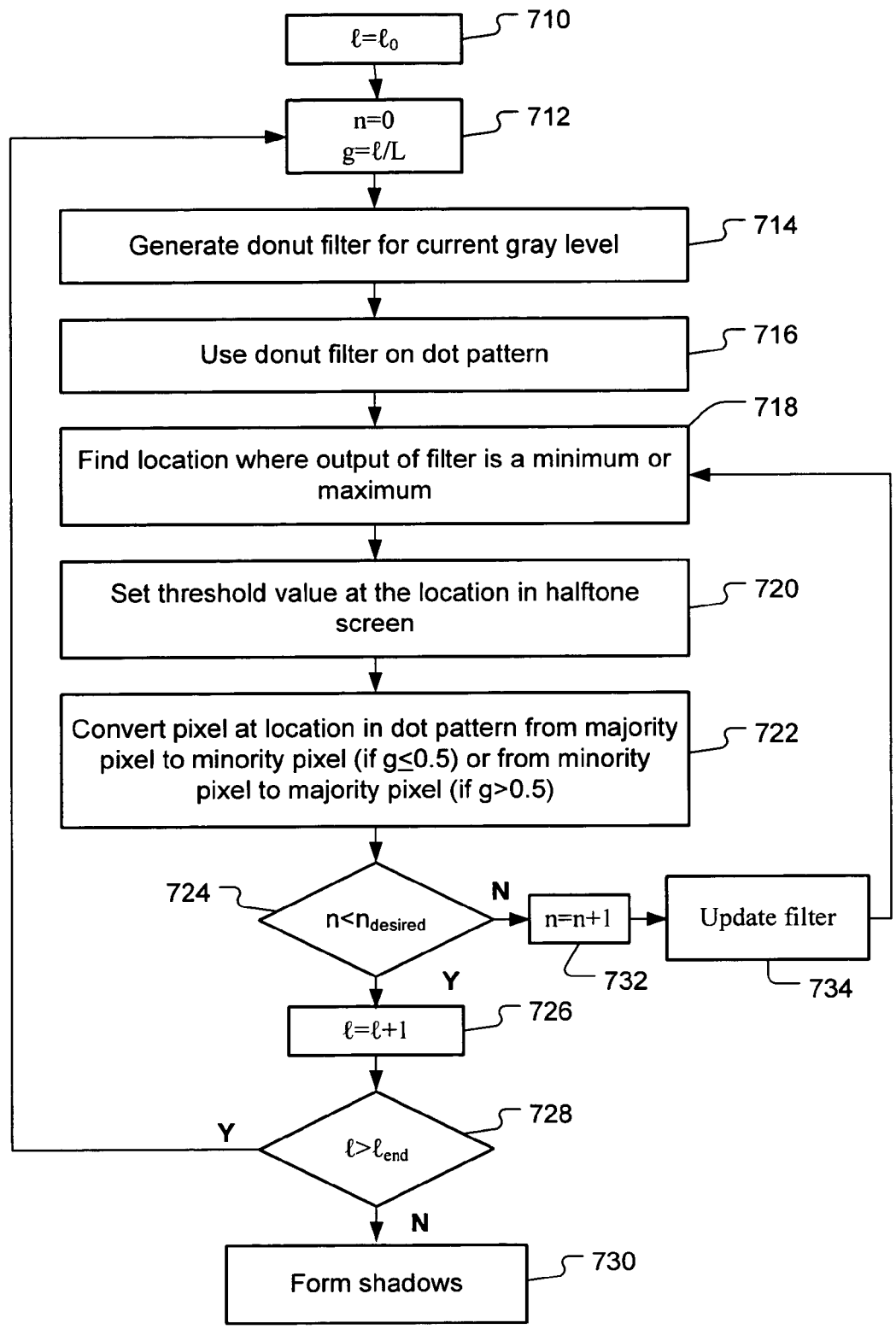
FIG. 7 is an illustration of a method of designing a monochrome AM-FM halftone screen according to an embodiment of the present invention.

Reference is now made to FIG. 7, which illustrates a method of growing clusters in a monochrome AM-FM halftone screen. The halftone screen is denoted by S. S[i,j] refers to the threshold value at the screen location [i,j].

The clusters are grown from an existing pattern φ. The existing pattern φ could consist entirely of cluster centers, it could include partially grown clusters, etc.

At block 710, the gray level (l) is initialized to $l=l_0$. The initial gray level ($l_0$) corresponds to this existing pattern.

At block 712, an index (n) indicating dot concentration is initialized, and the current gray level (g) is computed as l/L, where L is the total number of gray levels. At block 714, a donut filter $D_g[i,j]$ is generated for the current gray level.

At block 716, the donut filter $D_g$ is used to filter the pixel pattern φ. The filtered output is denoted as $O_g^{(n)}$. Locations of minority pixels are set to $O_g^{(n)}[i,j]=1$, and locations of majority pixels are set to $O_g^{(n)}[i,j]=00$.

At block 718, the location [i*,j*] where $O_g^{(n)}[i,j]$ is a minimum value (if g≤0.5) or maximum value (of g>0.5) is found subject to the constraint that $O_g^{(n)}[i,j]$ is a majority pixel when g<0.5 or a minority pixel when g≥0.5. The dots having these minimum and maximum values are closest to satisfying the spatial profile probability function.

At block 720, the threshold value at location [i*,j*] in the screen (S) is set. The threshold value may be set to S[i*j*]=l.

At block 722, the pixel at the location [i*,j*] is converted from a majority pixel to a minority pixel if g≤0.5. Thus φ[i*,j*]=1. The pixel at the location [i*,j*] is converted from a minority pixel to a majority pixel if g≥0.5. Thus φ[i*,j*]=0.

If the desired concentration ($n_{desired}$) has been reached (block 724), the next gray level is processed (blocks 726-728). To process the next gray level, control is returned to block 712.

The clusters are grown up to gray level $l=l_{end}$ (block 728). Shadows are formed above gray level $l_{end}$ (block 730). The shadows may be formed using a conventional technique.

If the desired concentration ($n_{desired}$) has not been reached (block 724), the index (n) indicating concentration is incremented (block 732), and the filter $D_g$ is updated. The filter $D_g$ may be updated by returning to block 714. However, if the filter $D_g$ is linear, the output $O_g^{(n)}[i,j]$ of the filter $D_g$ may instead be updated (block 734) using one addition per pixel as follows:

$$O_g^{(n+1)}[i,j] \leftarrow \begin{cases} O_g^{(n)} + Dg[\text{mod}(i^* - i, M), \text{mod}(j^* - j, N)] & \text{for } g \leq 0.5 \\ O_g^{(n)} - Dg[\text{mod}(i^* - i, M), \text{mod}(j^* - j, N)] & \text{for } g > 0.5 \end{cases}.$$

After the filter has been updated (block 734), control is returned to block 720.

The method according to the present invention can be implemented in software, firmware, and/or hardware, For example, the method can be implemented in software (executable code) by the processor of a host computer and/or the processor of an image forming device. Alternatively, the method can be implemented in a dedicated or specially-programmed logic device, such as an ASIC (Application Specific Integrated Circuit) or microcontroller.

Figure 8:
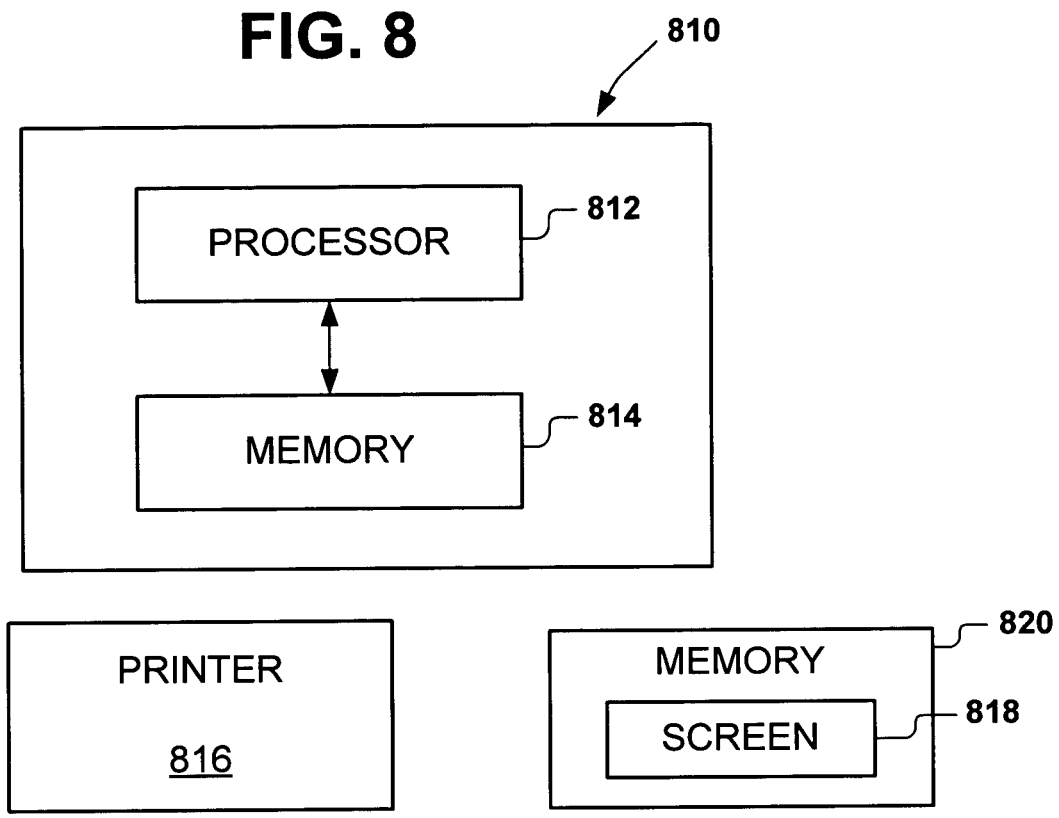
FIG. 8 is an illustration of a system for designing an AM-FM screen according to an embodiment of the present invention.

FIG. 8 illustrates another example: a system 810 including a general purpose processor 812 and memory 814. The memory 814 is encoded with a program that causes the processor 812 to generate an AM-FM halftone screen for a laser printer 816. The halftone screen is generated by growing dot clusters according to at least one linear filter based on a spatial probability profile function.

The printer 816 can be used to adjust the halftone screen. The halftone screen is used to create dither patterns, and the dither patterns are printed by the printer. The printed patterns are observed, the spatial probability profile function is adjusted according to the observation, and a new screen is generated according to the adjusted function. For example, if excessive clumping is observed in the printed pattern, the dead zone of the spatial probability profile function may be increased, and a new screen is generated according to the adjusted function.

The AM-FM screen may be distributed in a variety of ways. Once a screen is generated, it may be loaded into a printer as part of its software. For other types of printers, the screen may be part of a print driver. The screen 818 can be distributed via a removable memory medium 820 such as an optical disc (e.g., DVD) or transmitted (e.g., over the Internet) from memory 820 of one machine to another, etc.

The system may be used to generate an AM-FM screen for a laser printer or laser printing system. However, the present invention is not limited to this particular context or application, but rather, is broadly applicable to other image forming device and printing system application.

Although several specific embodiments of the present invention have been described and illustrated, the present invention is not limited to the specific forms or arrangements of parts so described and illustrated. Instead, the present invention is construed according to the following claims.

The invention claimed is:

1. A method of generating a halftone screen, the method comprising:
    deriving at least one linear filter from a spatial probability profile function that specifies a probability of a minority pixel in the respective halftone pattern being at a given distance from the respective center of any of the grown minority pixel clusters;
    for each of one or more gray levels, determining a respective halftone pattern comprising a respective stochastic distribution of centers of respective clusters, wherein each of the clusters comprises one or more minority pixels of the respective halftone pattern;
    for each of one or more of the gray levels, producing a respective dither halftone pattern, wherein the producing comprises applying the at least one linear filter to the respective halftone pattern; and
    generating the halftone screen from the one or more dither halftone patterns;
    wherein the determining, the producing, and the generating are performed by a processor.

2. The method of claim 1, wherein the determining is performed for all gray levels between an initial gray level and a transition gray level; and wherein the producing is performed for gray levels above the gray transition level.

3. The method of claim 1, wherein the producing comprises applying to the respective halftone pattern filters that are parameterized by gray level.

4. The method of claim 3, wherein the clusters are grown one gray level at a time.

5. The method of claim 3, wherein a single filter is used to grow the clusters at each gray level.

6. The method of claim 3, wherein the filters are linear and spatially invariant.

7. The method of claim 3, wherein the filters are donut filters.

8. The method of claim 7, wherein the filter is updated, for being used for a current gray level, after generating the filter for the current gray level and growing the dot clusters in response to a desired concentration of dots not being reached.

9. The method of claim 1, wherein the spatial probability profile function includes a minimum and a maximum.

10. The method of claim 1, wherein the spatial probability profile function is maximally flat and has a minimum, cluster growth inhibited at the minimum.

11. The method of claim 10, wherein the spatial probability profile function has a dead zone at the minimum.

12. The method of claim 1, further comprising determining the spatial probability profile function from an existing screen.

13. The method of claim 1, wherein threshold values are assigned to the screen according to the growth of the clusters.

14. The method of claim 1, wherein a filter is used to filter a dot pattern at a current gray level;
    a dot having a minimum or maximum value in the filtered pattern is selected; and
    a threshold in the screen is set, the location of the threshold corresponding to the selected dot.

15. The method of claim 1, wherein the at least one filter $(D_g(r))$ is defined as $$D_g(r) = (1-\alpha) \cdot \frac{\log(\delta + Z_g(r))}{\log(\delta + Z_g(0))} + \alpha \cdot e^{-r^2},$$

where r is a radial distance from a cluster center, $\alpha$ is a first value, $\delta$ is as second parameter value, g is the respective gray level, $Z_g(r)$ the spatial probability profile function, and log( ) is a logarithm function.

16. An article, comprising a non-transitory computer-readable storage device comprising computer-executable instructions that, when executed by a processor, cause the processor to perform operations comprising: deriving at least one linear filter from a spatial probability profile function that specifies a probability of a minority pixel in the respective halftone pattern being at a given distance from the respective center of any of the grown minority pixel clusters; for each of one or more gray levels, determining a respective halftone pattern comprising a respective stochastic distribution of centers of respective clusters, wherein each of the clusters comprises one or more minority pixels of the respective halftone pattern; for each of one or more of the gray levels, producing a respective dither halftone pattern, wherein the producing comprises applying the at least one linear filter to the respective halftone pattern; and generating the halftone screen from the one or more dither halftone patterns.

17. The article of claim 16, wherein the producing comprises applying to the respective halftone pattern filters that are parameterized by gray level.

18. The article of claim 16, wherein the at least one filter is a donut filter.

19. The article of claim 18, wherein the at least one filter is updated, for being used for a current gray level, after generating the filter for the current gray level and growing the dot clusters in response to a desired concentration of dots not being reached.

20. The article of claim 16, wherein the spatial probability profile function includes a minimum and a maximum.

21. The article of claim 20, wherein the spatial probability profile function is maximally flat and has a minimum, cluster growth inhibited at the minimum.

22. The article of claim 21, wherein the spatial probability profile function has a dead zone at the minimum.

23. The article of claim 16, wherein: the at least one linear filter is used on a dot pattern at a given gray level; a dot having a minimum or maximum value in the filtered pattern is selected; and a threshold in a screen is set, the location of the threshold corresponding to the selected dot.

24. The article of claim 16, wherein the at least one filter $(D_g(r))$ is define as $$D_g(r) = (1-\alpha) \cdot \frac{\log(\delta + Z_g(r))}{\log(\delta + Z_g(0))} + \alpha \cdot e^{-r^2},$$

where r is a radial distant from a cluster center, α is a first parameter value, δ is a second parameter value, g is the respective gray level, $Z_g(r)$ is the spatial probability profile function, and log( ) is a logarithm function.

25. Apparatus, comprising:

a computer-readable medium storing computer-readable instructions; and a data processor coupled to the computer-readable medium, operable to execute the instructions, and based at least in part on the execution of the instructions operable to perform operations comprising deriving at least one linear filter from a spatial probability profile function that specifies a probability of a minority pixel in the respective halftone pattern being at a given distance from the respective center of any of the grown minority pixel clusters, for each of one or more gray levels, determining a respective halftone pattern comprising a respective stochastic distribution of centers of respective clusters, wherein each of the clusters comprises one or more minority pixels of the respective halftone pattern, for each of one or more of the gray levels, producing a respective dither halftone pattern, wherein the producing comprises applying the at least one linear filter to the respective halftone pattern, and generating the halftone screen from the one or more dither halftone patterns.

26. The apparatus of claim 25, wherein the at least one filter ($D_g(r)$) is defined as $$D_g(r) = (1-\alpha) \cdot \frac{\log(\delta + Z_g(r))}{\log(\delta + Z_g(0))} + \alpha \cdot e^{-r^2},$$

where r is a radial distance from a cluster center, α is a first parameter value, δ is a second parameter value, g is the respective gray level, $Z_g(r)$ is the spatial probability profile function, and log( ) is a logarithm function.

* * * * *